United States Patent [19]

Bunda et al.

[11] 3,869,410

[45] Mar. 4, 1975

[54] CATALYST CARRIER FOR EXHAUST GAS PURIFIER

[75] Inventors: Tsuchio Bunda, Okazaki; Itaru Niimi, Nagoya; Yasuhisa Kaneko; Fumiyoshi Noda, both of Tokyo, all of Japan

[73] Assignee: Toyota Jidosha Kogyo Kabushiki Kaisha, Toyota-shi, Japan

[22] Filed: Sept. 1, 1972

[21] Appl. No.: 285,594

[30] Foreign Application Priority Data
Sept. 3, 1971   Japan.............................. 46-67922

[52] U.S. Cl.......... 252/455 R, 252/463, 252/477 R, 423/213.2, 423/213.5
[51] Int. Cl.............................................. B01f 11/06
[58] Field of Search............ 252/463, 466 A, 477 R, 252/455 R; 423/213.2, 213.5; 156/89

[56] References Cited
UNITED STATES PATENTS
3,133,029   5/1964   Hoekstra........................ 423/213.2
3,168,368   2/1965   Mills............................... 423/213.5
3,254,966   6/1966   Bloch et al..................... 252/477 R
3,347,798   10/1967  Baer et al....................... 252/477 R
3,392,125   7/1968   Kelly et al...................... 252/463 X FOREIGN PATENTS OR APPLICATIONS
763,944   7/1967   Canada........................... 252/477 R Primary Examiner—Patrick P. Garvin
Assistant Examiner—W. J. Shine
Attorney, Agent, or Firm—Stevens, Davis, Miller & Mosher

[57] ABSTRACT

A catalyst carrier for exhaust gas purification comprising a plurality of hollow type alumina balls which are packed in a case of catalytic muffler, or alternatively sintered into a predetermined formation and incorporated in a catalytic muffler in the exhaust system of an internal combustion engine for motor vehicles such as automobiles, motorcycles and motorbikes.

5 Claims, 4 Drawing Figures

3,869,410

CATALYST CARRIER FOR EXHAUST GAS PURIFIER

BACKGROUND OF THE INVENTION

A catalyst carrier comprising alumina particles of the solid ball type has hitherto been proposed as a substrate onto which to deposit a catalyst for purifying the exhaust gas of automobiles.

When the carrier of the solid type is used, it requires a period of 3 to 4 minutes before the catalyst deposited on such carrier is heated to the temperature at which it becomes active. This results from the fact that the carrier of this type has an increased thermal capacity since it is fully filled with alumina. Thus, from the lack of catalytic action occurring during cold starts of the engine, a large amount of noxious exhaust gas is discharged into the air before the catalyst has reached its active temperature.

The amount of harmful exhaust gas is estimated at 70 to 90 percent of the total amount of gas discharged during the period extending from engine starting until the catalyst has reached its active temperature.

On the other hand, it is well known that a maximum amount of harmful gas tends to be discharged during cold starting of an engine. This fact is adopted in the current Japanese exhaust gas regulation for automobiles, or U.S. Federal Test Procedure for automobiles, under which the maximum amount of each noxious gas allowed to be discharged at running conditions which occur during cold starting of an engine is restricted to a certain amount. For example, the content of carbon monoxide (CO), hydrocarbon (HD) and nitrogen monoxide (NO), respectively, should be less than a certain percent ($\alpha$) of the total amount of the exhaust gas, or less than a certain amount ($\beta$g) per mile as converted in terms of a drive distance.

Therefore, the prior catalysts whwerein the carrier is formed of solid type alumina balls is not legally acceptable when it is used alone. This problem has usually been solved by improving the warm-up time of the catalytic muffler so that the catalyst may sufficiently be heated during a limited time. Certain extra attachments must be mounted to retain the heat of the muffler enclosing the catalyst or the exhaust pipe connecting this catalytic muffler with the engine. The use of the catalyst carrier of the present invention improved the warm-up time of the catalytic muffler without mounting such extra attachments. The purifying capacity of the catalyst for the exhaust gas is thereby increased about 30 percent over the capacity of the conventional solid type alumina balls catalyst carrier system.

SUMMARY OF THE INVENTION

Accordingly, a principal object of this invention is to provide a catalyst carrier of which decreases the time necessary to heat the catalyst to its active temperature, and eventually purify the exhaust gas more efficiently, in particular, during cold starting of the engine. A plurality of hollow type alumina balls are used as the catalyst carrier in this invention, thereby lowering the thermal capacity of the carrier and dispensing with the necessity for extra attachments which typically must be installed in order to decrease the warm-up time required to heat a catalyst to its active temperature when using the prior type of carrier.

Other objects and advantages of the invention will become apparent from the following description.

DETAILED DESCRIPTION OF THE INVENTION

The present invention relates to a catalyst carrier of the type adapted for purifying the exhaust gas of automobiles, motorcycles, motorbikes, and motor vehicles generally, and more particularly to a carrier which is capable of allowing the catalyst to be more quickly and efficiently heated to become active during cold starting of an engine so that the purifier incorporating a catalyst may efficiently purify the exhaust gas throughout the time of operation of the engine.

Each individual alumina ball used according to the invention has a void in its interior.

The thermal capacity of the individual ball may be reduced by enlarging this void in order to decrease the warm-up time of the muffler housing the catalyst. However, the ball itself tends to be easily destroyed if the void is excessively enlarged. Therefore, the size of the void should be selected to provide the alumina ball with both adequate durability and low thermal capacity.

These alumina balls of hollow type can be used directly as a catalyst carrier packed in a suitable muffler case, but more advantageously they are formed into a mass having a desired shape by subjecting them to sintering at elevated temperature. This latter embodiment prevents the alumina balls from wearing away and from breakage caused by vibrations during driving an automobile equipped with such catalyst carrier. The wear and breakage of the balls may result in exaggerating the exhaust pressure and cause deflected flow of the exhaust gas.

Figure 1:
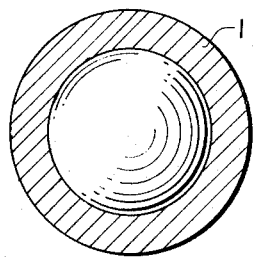
FIG. 1 is a section along the central diameter of an alumina ball of hollow type used in the present invention.
Figure 2:
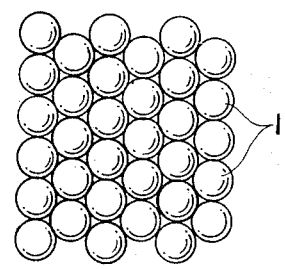
FIG. 2 is a mass composed of a plurality of alumina balls formed into a shape by sintering.
Figure 3:
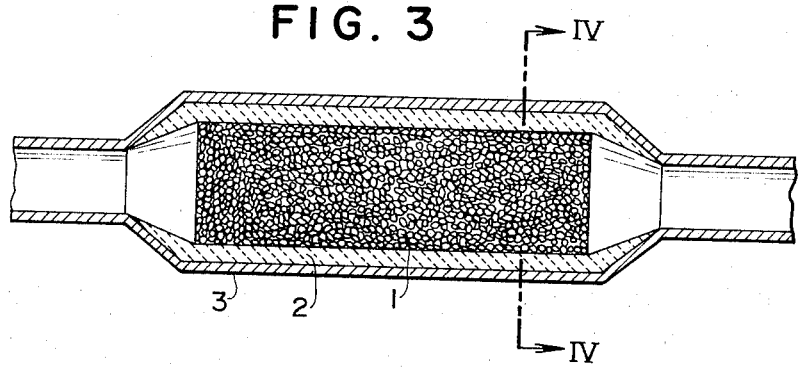
FIG. 3 is a side section view of a case including a catalyst carrier formed of hollow type alumina balls charged with a platinum catalyst.
Figure 4:
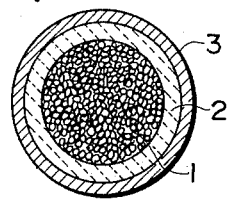
FIG. 4 is a cross-section along the line IV—IV of the catalyst case illustrated in FIG. 3, showing a heat insulating layer and the catalyst case.

The alumina balls of hollow type indicated at 1 in FIG. 1 of the accompanying drawings are first charged with either metallic catalysts or catalysts of metallic oxides, and then surrounded by a heat insulating layer 2 formed of insulating materials such as ceramic fiber.

These balls are placed in a catalyst case 3 of an automobile muffler to serve as an exhaust gas purifier.

According to our observations, the weight and the thermal capacity of the carrier formed of the hollow type alumina balls of the present invention may be reduced to about a half of those of the conventional carrier of solid type alumina balls for the same cubic volume. Thus, the warm-up efficiency of the muffler is raised by about 40 percent, and the catalyst charged on the carrier of the present invention is therefore able to purify the exhaust gas more efficiently. For example, when using this carrier with a platinum catalyst, the purifying ability is improved by about 33 percent for the carbon monoxide content, and about 24 percent for the hydrocarbon content of an exhaust gas. When using the same carrier, this time impregnated with palladium, the purifying ability for nitrogen oxides is improved by about 28 percent as compared with the ability of the conventional type catalytic converters.

The following examples illustrate preferred embodiments of the present invention.

EXAMPLE 1

The hollow type alumina balls of about 2 to 5mm in outside diameter (bulk density: about $0.4 g/cm^3$) are immersed in a mixture of colloidal silica and colloidal alumina in weight ratio of about 15:85. Having removed them from the mixture, the balls are then placed in an alumina pot (inside diameter about 150mm × height about 150mm) to dry them at about 60°C for about 24 hours. Thereafter, the balls are subjected to sintering at about 1,400°C for about 8 hours. A sinter-bonded mass of the hollow type balls, is thus produced having a size of about 150mm diameter × about 150mm height.

This mass is then immersed in colloidal alumina. After air-drying for about 24 hours, the mass is heated at about 700°C for about 2 hours and then cooled. The mass thus surface-treated is charged with platinum.

For the purpose of examining the purifying ability for exhaust gas, the mass charged with platinum was mounted in a muffler, which was set in position in the exhaust pipe about 1,200 mm from the exhaust manifold of the engine.

The same examination was also carried out using a catalyst carrier of solid type alumina balls (diameter: about 4 to 5mm, bulk density: about $0.89 g/cm^3$) charged with platinum. The size was about 150mm diameter × about 100mm length, and the muffler mounted with this catalyst was placed at the same position as the case using the carrier of the present invention.

The results of the two examinations are shown in Table 1.

TABLE 1

| Items | Catalyst of hollow type alumina balls | Catalyst of solid type alumina balls |
|---|---|---|
| Time required for the catalyst layer to reach 300°C | 55 Sec. | 1 Min. and 43 Sec. |
| Purifying ability for carbon monoxide, as expressed by its content (average of 10 min. measurement) | 0.4% | 0.6% |
| Purifying ability for hydrocarbon, as expressed by its content (average of 10 min. measurement) | 38 ppm | 50 ppm |

In these examinations an engine of 1,400 CC and four cylinders was used. Running cycles of: 800 rpm for 20 sec.; 2,000 rpm for 30 sec.; 1,400 rpm for 20 sec.; 3,000 rpm for 10 sec.; 2,000 rpm for 10 sec.; and stopping, were repeated using each catalyst carrier system, while the gas was supplied from the cylinder head port.

EXAMPLE 2

A catalyst carrier of hollow type alumina balls with their surface treated similarly as shown in Example 1, and a carrier of solid type alumina balls, available on the market, were respectively impregnated with palladium. The mufflers mounted with each of the above catalysts were respectively placed in the position explained in Example 1. The examination was made to evaluate the purifying ability for nitrogen oxides using the same engine running under the same conditions as in Example 1. The results are shown in Table 2.

TABLE 2

| Items | Catalyst of hollow type alumina balls | Catalyst of solid type alumina balls |
|---|---|---|
| Time required for the catalyst layer to reach 400°C | 1 Min. and 26 Sec. | 2 Min. and 18 Sec. |
| Purifying ability for N* oxides, as expressed by its content (average of 10 min. measurement) | 180 ppm | 250 ppm |

*nitrogen

In the above examination, the air and fuel ratio was about 13.1.

As shown in Examples 1 and 2, the warm-up efficiency of the muffler is remarkably increased and the purifying ability for the exhaust gas is improved by about 30 percent when the catalyst carrier of the present invention is employed.

What is claimed is:

1. A method for manufacturing a catalyst carrier of a sintered-bonded mass of coated hollow alumina balls for an exhaust gas purifier, comprising:
    a. immersing a plurality of hollow alumina balls having a size of 2–5mm in outside diameter in a mixture of colloidal silica and colloidal alumina,
    b. air-drying the hollow alumina balls coated with said silica and alumina,
    c. placing said coated alumina balls in a mass so that the balls are in contact with each other,
    d. sintering said mass of alumina balls to form a sintered-bonded mass,
    e. immersing said mass of alumina balls in colloidal alumina, and
    f. air-drying, heating and cooling said mass of alumina balls.

2. The method of claim 1, wherein said mixture of colloidal silica and colloidal alumina comprises a mixture of 15 parts by weight colloidal silica and 85 parts by weight colloidal alumina, in water.

3. The method of claim 1 wherein said sintering is conducted at a temperature of about 1,400°C. for about 8 hours.

4. The method of claim 1, wherein said mass of alumina balls are air-dried for about 24 hours and heated to a temperature of about 700°C for about 2 hours.

5. A method for manufacturing a catalyst supported on a carrier of a sintered-bonded mass of coated hollow balls for an exhaust gas purifier, comprising steps (a)–(f) according to claim 1, followed by (g) depositing a metal or metal oxide catalyst on said mass of coated alumina balls in which said catalyst is capable of initiating purification of exhaust gas from an internal combustion engine.

* * * * *